May 3, 1960
F. P. REDING
2,935,502
PROCESS FOR THE HIGH TEMPERATURE, HIGH PRESSURE
SHEAR DEGRADATION OF SOLID POLYETHYLENE
Filed Feb. 5, 1958
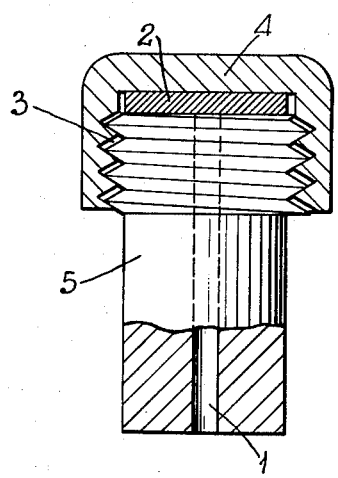
INVENTOR.
FREDERICK P. REDING
BY *Louis C. Smith*
ATTORNEY

2,935,502

PROCESS FOR THE HIGH TEMPERATURE, HIGH PRESSURE SHEAR DEGRADATION OF SOLID POLYETHYLENE

Frederick P. Reding, Charleston, W. Va., assignor to Union Carbide Corporation, a corporation of New York Application February 5, 1958, Serial No. 713,377

3 Claims. (Cl. 260—94.9)

This invention relates to a process for improving the properties of solid polyethylene.

Solid ethylene polymers having molecular weights of above about 8,000 can be produced by polymerizing ethylene by the well known high pressure processes described in U.S. Patent No. 2,153,553 issued to Fawcett et al. and in U.S. 2,188,465 issued to Perrin et al.; and also by means of the recently disclosed Ziegler catalysts at low pressures. By the process described in the above-indicated U.S. patents, ethylene is polymerized at reactor pressures above about 7,500 p.s.i. and reactor temperatures above about 100° C. either in the absence or in the presence of oxygen producing catalysts. In addition to the catalysts therein disclosed, many others have since been found satisfactory and patented. The polyethylene produced, however, in all instances contain some extremely high molecular weight, micro gel molecules which cause surface roughness when the polymer is used to prepare thin films or fibers. As a consequence, clear polyethylene film cannot be produced from unmodified polyethylene unless the very high molecular weight, micro gel has been eliminated.

The production of polyethylene at high pressures is a highly exothermic reaction, and requires the removal of large amounts of heat. For this reason, the reaction is normally carried out in a tubular converter, and conversion of monomer to polymer in a single pass through the converter is ordinarily from about 10% to about 25% of the monomer charged. The unreacted ethylene and polymer formed are released from the tubular converter through a suitable valve, which is opened periodically, and collected in a product receiver where the polymer and monomer are separated from each other. The pressure in the product receiver, generally about 1,000 p.s.i., is much lower than that in the converter, and the sudden drop in pressure facilitates the removal of unreacted ethylene from the polymer.

It has now been found that the very high molecular weight, micro gel molecules can be preferentially eliminated or destroyed by a high temperature shear degradation of the polymer as it is released from the tubular converter, and that this shear degradation can be carried out at pressures and temperatures which had heretofore been considered impractical. It has also been found that the very high molecular weight, micro gel molecules present in any sample of polyethylene, regardless of the manner in which the polymer was produced, can be preferentially eliminated by heating the resin to a temperature above about 100° C., preferably from about 100° C. to about 300° C., under a pressure of above about 7,500 p.s.i., preferably from about 7,500 p.s.i. to about 60,000 p.s.i. or higher, and extruding the molten resin through a fine channel or capillary, which can be a spiral channel or capillary or a straight channel or capillary. To prevent oxidative degradation this heating is preferably conducted in the absence of air.

The process of this invention can be more readily understood by further reference to the drawing and specification.

The figure shows a side view of a spiral channel attached to the high pressure, high temperature apparatus employed in the laboratory.

By the process of this invention the high molecular weight, micro gel polymer in polyethylene produced by the high pressure processes can be preferentially shear degraded as the unreacted ethylene and polymer are released from the tubular converter into the product receiver at converter pressures which vary from about 7,500 p.s.i. to about 60,000 p.s.i. and temperatures of from about 100° C. to about 300° C. The high temperature shear degradation can be accomplished by inserting a channel system at the exit of the tubular converter so that the unreacted ethylene and polymer are forced from the converter through the channels or capillaries and into the product receiver at the temperatures and pressures present in the converter. As the mixture is forced through the channels by the pressure in the converter, it is preferentially shear degraded at the high temperature present in the converter, and is collected in the product receiver, which is generally at a pressure of about 1,000 p.s.i., and cooled.

The length of the channel is not narrowly critical; preferably, however, it should be at least about 2 inches long to insure sufficient preferential shear of the high molecular weight, micro gel resin. As previously indicated, the channels may be linear or spiral, or they may be of any other shape desired. The cross section of the spiral channel is preferably rectangular and the preferred cross sectional dimensions are about 0.03 inch by from about 0.003 to about 0.01 inch in width. In any instance, the channel should not be greater than about 0.03 inch in cross section for optimum results.

The sealing cap illustrated in the figure was employed in the laboratory to improve the properties of a sample of polyethylene which had been produced by the process of U.S. 2,188,465. This resin had a molecular weight of about 24,000, and when extruded, produced a 4 mil film having a hazy appearance. A portion of this resin was heated to 250° C. and extruded under a pressure of 55,000 p.s.i. through the spiral channel illustrated in the figure. The molten resin was forced through the hole 1 of the tube 5, and through a grooved plate 2 inserted to prevent complete sealing of the tube 5, to and through the spiral channel 3, which was formed by cutting the thread on the cap 4 slightly larger than the thread on the tube 5. The total length of the channel around the spiral was about 5 inches, and the diameter of the spiral was 3/8 inch. The polyethylene so extruded was almost free of very high molecular weight, micro gel polymer and film produced therewith was quite transparent and smooth surfaced. The cross section of the channel 3 was rectangular and about 0.03 inch by about 0.003 to about 0.008 inch in width.

The high pressure, high temperature shear degradation preferentially shear degrades the very high molecular weight, micro gel molecules present in the polymer, which are one of the main causes of hazy film formation, without affecting the normal molecular weight molecules present in the polyethylene.

What is claimed is:

1. A process for the high temperature, high pressure shear degradation of solid polyethylene, which comprises preferentially shear degrading the very high molecular weight, microgel molecules by extruding the molten polyethylene under a pressure of from about 20,000 p.s.i. to about 60,000 p.s.i. and at a temperature of from about 100° C. to about 300° C. through a channel at least about 2 inches long having cross-sectional dimensions not greater than 0.03 inch.

2. A process for the high temperature, high pressure shear degradation of solid polyethylene, which comprises preferentially shear degrading the very high molecular weight, micro gel molecules by extruding the molten polyethylene under a pressure of at least about 20,000 p.s.i. at a temperature of about 250° C. through a channel at least about 2 inches long having rectangular cross sectional dimensions of about 0.03 inch by from about 0.003 to about 0.01 inch.

3. A process for the high temperature, high pressure shear degradation of solid polyethylene, which comprises preferentially shear degrading the very high molecular weight, micro gel molecules in said polyethylene under a pressure of at least about 20,000 p.s.i. at a temperature of about 250° C. through a channel at least about 2 inches long having rectangular cross sectional dimensions of about 0.03 inch by from about 0.003 to about 0.01 inch.

References Cited in the file of this patent

UNITED STATES PATENTS

| | | |
|---|---|---|
| 2,367,173 | Martin | Jan. 9, 1945 |
| 2,799,668 | Anderson et al. | July 16, 1957 |